No. 765,173. PATENTED JULY 19, 1904.
R. C. FAY.
VARIABLE SPEED TRANSMISSION DEVICE.
APPLICATION FILED DEC. 14, 1903.
NO MODEL. 2 SHEETS—SHEET 1.
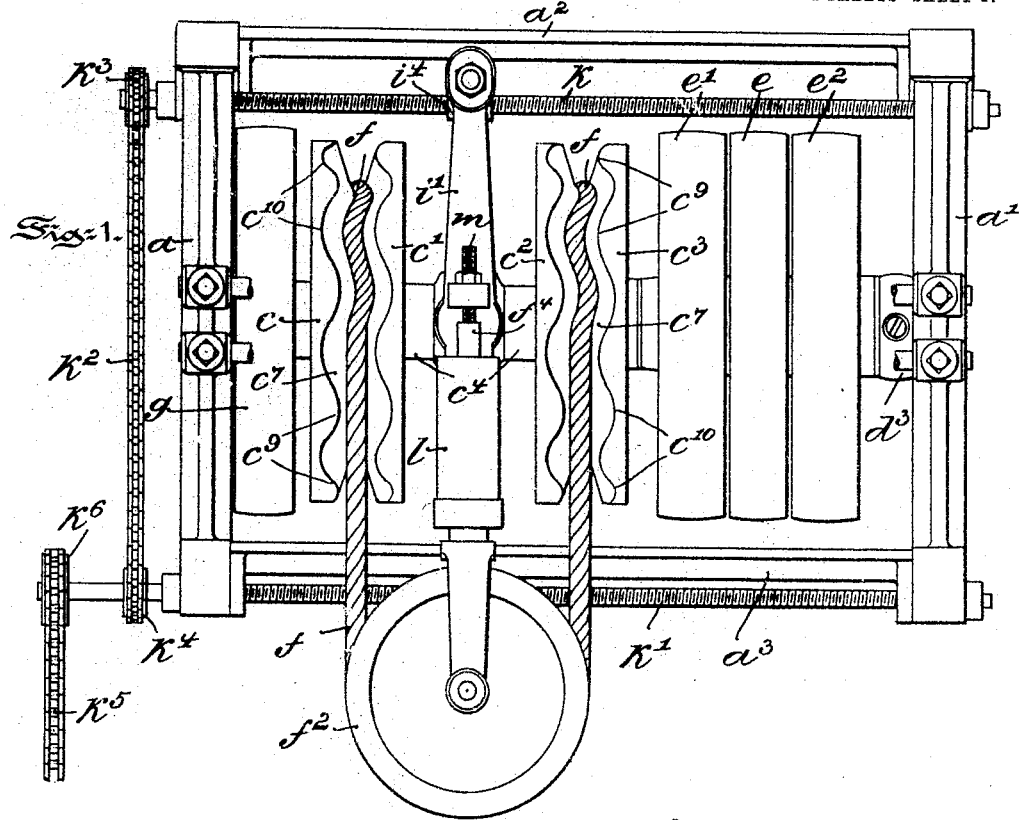
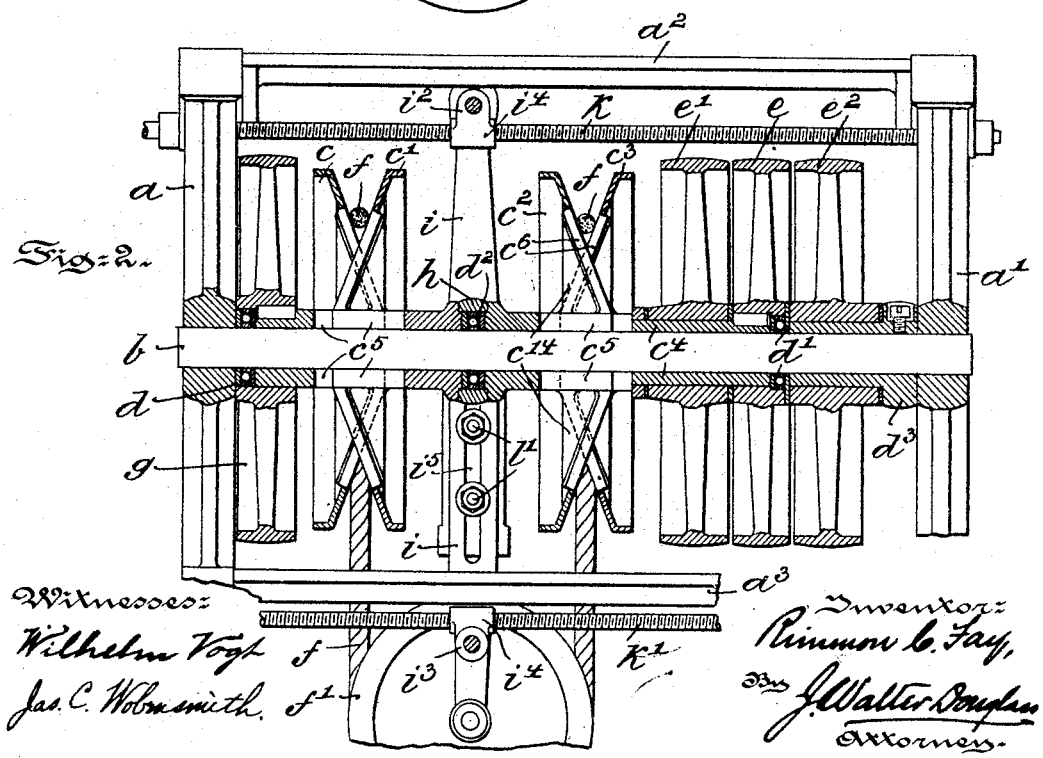

No. 765,173. PATENTED JULY 19, 1904.
R. C. FAY.
VARIABLE SPEED TRANSMISSION DEVICE.
APPLICATION FILED DEC. 14, 1903.
NO MODEL. 2 SHEETS—SHEET 2.
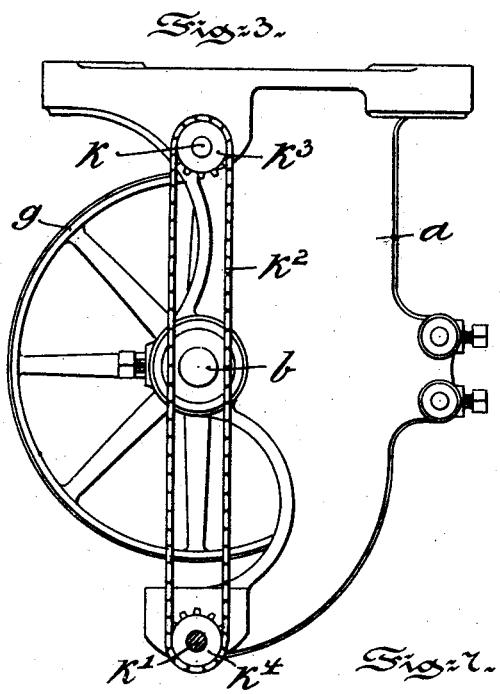
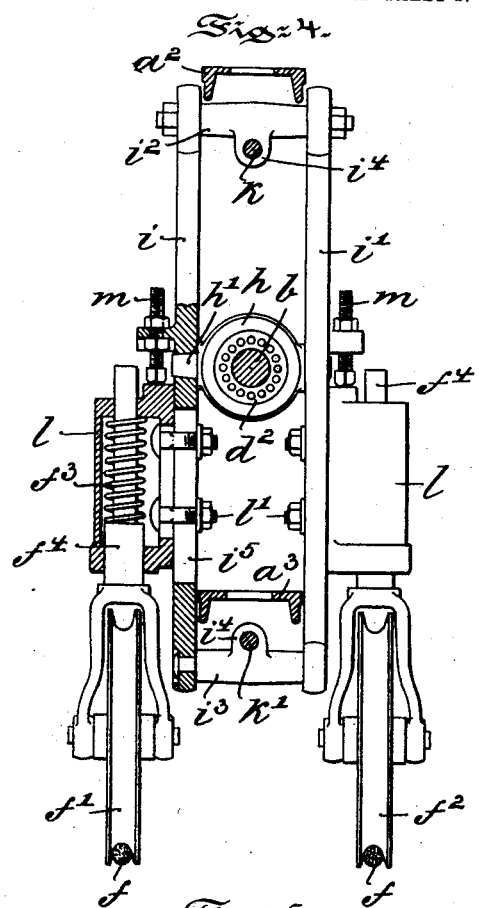
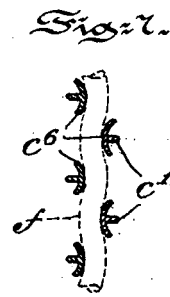
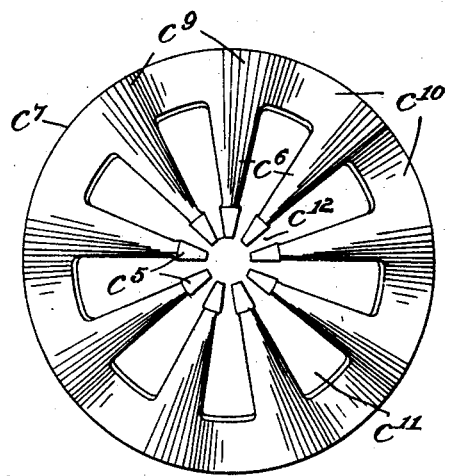
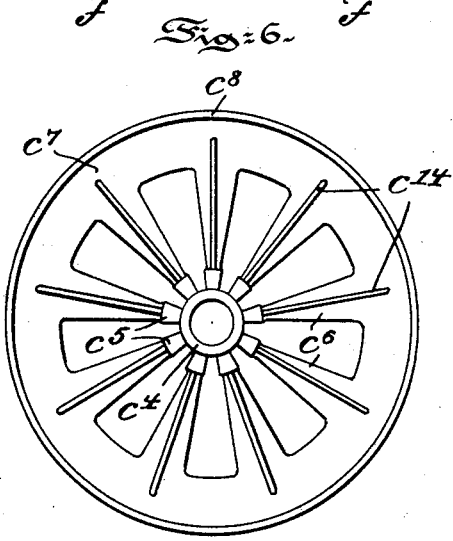

No. 765,173.

Patented July 19, 1904.

UNITED STATES PATENT OFFICE.

RIMMON C. FAY, OF PHILADELPHIA, PENNSYLVANIA.

VARIABLE-SPEED-TRANSMISSION DEVICE.

SPECIFICATION forming part of Letters Patent No. 765,173, dated July 19, 1904.

Application filed December 14, 1903. Serial No. 185,029. (No model.)

*To all whom it may concern:*

Be it known that I, RIMMON C. FAY, a citizen of the United States, residing at the city of Philadelphia, in the county of Philadelphia and State of Pennsylvania, have invented certain new and useful Improvements in Variable-Speed-Transmission Devices, of which the following is a specification.

My invention has relation to a variable-speed-transmission device; and in such connection it relates to the construction and arrangement of parts constituting such a device.

The principal object of my invention is to provide a comparatively simple and efficient device for increasing or decreasing a given speed in transmission to mechanism adapted to be controlled as to the variable-degree speed by such a device.

The nature and scope of my present invention will be more fully understood from the following description, taken in connection with the accompanying drawings, forming part hereof, in which—

Figure 1 is a side elevational view of a variable-speed-transmission device embodying main features of my present invention. Fig. 2 is a view partly in elevation and partly in longitudinal central section of the device. Fig. 3 is a front elevational view thereof. Fig. 4 is a view illustrating, partly in section and partly in elevation, means for controlling the position of frusto-conical disks with respect to each other and tension means for a rope or cord adapted to connect two pairs of disks with each other. Figs. 5 and 6 are respectively front and rear elevational views of a frusto-conical disk, and Fig. 7 is a diagrammatic view illustrating means for gripping a rope or cord in its passage over the disks.

In the drawings, $a$ and $a'$ represent hangers or brackets, which are connected with each other by means of bars or braces $a^2$ and $a^3$. These hangers and braces in the present instance form the framework of the variable-speed-transmission device. To the hangers $a$ and $a'$ is rigidly secured a shaft $b$, upon which are loosely mounted two pairs of interlocking frusto-conical disks $c\ c'$ and $c^2\ c^3$ of the following preferred construction: The frustum or hub $c^4$ of each of said disks $c\ c'$ and $c^2\ c^3$ is slotted, forming a series of blocks $c^5$, which are connected with each other by the remaining solid portion of the hub $c^4$. From these blocks $c^5$ so formed radiate arms $c^6$, terminating in a corrugated rim $c^7$, provided with a flange $c^8$, as shown in Figs. 2, 5, and 6. Each of the arms $c^6$ is arched or curved in cross-section and merges into an elevation $c^9$ of the rim $c^7$, which elevations are united with each other by depressions $c^{10}$ for a purpose to be presently more fully explained. Between the arms $c^6$ are formed spaces or openings $c^{11}$, which extend or communicate with openings $c^{12}$, formed between the blocks $c^5$, as shown in Fig. 5. Each of the arms $c^6$ is provided with ribs $c^{14}$, extending from the blocks $c^5$ and terminating near the flange $c^8$ of the corrugated rim $c^7$. These ribs $c^{14}$, flange $c^8$, and solid portion $c^4$ of the hub strengthen the disk and form in conjunction with the arms $c^6$ a light yet strong and durable construction. The blocks $c^5$ and arms $c^6$ of two pairs of disks $c\ c'$ and $c^2\ c^3$ slide within the openings $c^{11}$ and $c^{12}$, arranged in the disks, as hereinbefore fully explained, and form when so united or coupled to each other a grooved pulley, as shown in Figs. 1 and 2. The alternate depressions and elevations of one disk fit into complemental depressions and elevations of the other disk, so that both disks form complemental corrugations arranged in parallel relationship to each other. The arms $c^6$, however, will not fill out the spaces $c^{11}$, while blocks $c^5$ fit snugly into the openings $c^{12}$ of the truncated portion of the frusto-conical disks and form the coupling means of two disks each with the other. The arms of two disks, forming a pulley, will form at the line of intersection a circumferential bearing-surface of curved or arched outline, separated from and arranged in staggered relationship to each other, as shown in Fig. 7. The solid hub portions $c^4\ c^4$ of the outer disks $c$ and $c^3$ bear, preferably, against thrust-bearings $d$ and $d'$ of a well-known type, one of which thrust-bearings, $d$, rests against the hanger $a$, and the other of the thrust-bearings, $d'$, rests against a sleeve $d^3$, adjustably mounted on the shaft $b$, as shown in Fig. 2. The inner disks $c'$ and $c^2$ are separated from each other by a thrust-bearing $d^2$, which consequently separates each pair of disks $c\ c'$ and $c^2\ c^3$ and renders the same independent of each other.

The preferred means of connecting each pair of disks $c\ c'$ and $c^2\ c^3$, forming combined grooved pulleys, consists in the present instance of an endless rope or cable $f$, passing over both pairs of disks and over idler-wheels $f'$ and $f^2$, preferably held under tension by means of springs $f^3$. The rope or cable $f$ by passing over the disks will either rest upon the curved faces of the arms $c^6$ or elevations of the rim $c^7$, according to the positions which the disks occupy to each other. In each instance the rope or cable will be tightly bound or clamped between the disks $c\ c'$ and $c^2\ c^3$, and so prevented from slipping on the same. At the same time any wear of the rope or cable will be effectually overcome, as no sharp surfaces are brought to bear against the same to cause, as is well known, rapid wear of the rope or cable $f$. The two pairs of disks united to each other by the rope or cable $f$ receive their rotary movement by the following preferred means.

On the hub $c^4$ of the outer disk $c^3$ is rigidly secured a pulley $e$, which is positively driven by a belt from any suitable source of power. (Not shown.) This rotary movement of the driving-pulley $e$ is transmitted through the hubs $c^4$ and disks $c^3$, $c^2$, and $c'\ c$ and rope or cable $f$ to a pulley $g$, rigidly secured to the hub $c^4$ of the disk $c$, from which driven pulley $g$ the rotary movement may be transmitted to any apparatus or mechanism which is required to be driven with a variable speed. Preferably at either side of the driving-pulley $e$ are arranged loose pulleys $e'$ and $e^2$.

As shown in Figs. 1 and 2, the frusto-conical and corrugated disks $c\ c'$ and $c^2\ c^3$ are disposed at equal distances apart, and hence it follows that both pairs of disks are driven with the same speed by the driving-pulley $e$. In order to change the speed of rotation between the driving-pulley $e$ and driven pulley $g$, the inner disks $c'$ and $c^2$ are moved between the outer stationary disks $c$ and $c^3$ by the following mechanism.

As shown in Fig. 2, between the hubs $c^4$ of the inner disks $c'$ and $c^2$ and surrounding the thrust-bearing $d^2$ is loosely mounted a collar $h$, provided with trunnions $h'$, which pivotally engage bars $i$ and $i'$, as shown in Fig. 4. These bars $i$ and $i'$ are united to each other at their respective ends by blocks $i^2$ and $i^3$, provided with extensions $i^4$. The bars $i$ and $i'$ and blocks $i^2$ and $i^3$ form a frame or yoke, which is held in proper position between the hangers $a$ and $a'$ by two threaded spindles $k$ and $k'$, passing through the extensions $i^4$ of the blocks $i^2$ and $i^3$. The threaded spindles $k$ and $k'$, movably supported by the hangers $a$ and $a'$, are connected with each other by a sprocket-chain $k^2$, which passes over sprocket-wheels $k^3$ and $k^4$, secured to the spindles $k$ and $k'$, as shown in Fig. 3. Preferably the lower spindle $k'$ is positively rotated by a chain $k^5$, engaging a sprocket-wheel $k^6$, secured to the same, which rotary movement is transmitted by the chain $k^2$ to the spindle $k$. By the rotation of the spindles $k$ and $k'$ the bars $i$ and $i'$ are shifted either to the right or left in Figs. 1 and 2 and move one of the slidable disks $c'$ or $c^2$ toward the stationary disks $c$ or $c^3$, so as to increase the diameter of the bearing-surface formed by two interlocking disks. The bearing-surface of the other pair of interlocking disks is correspondingly decreased by the action of the rope or cable $f$, which forces the slidable disk not positively actuated by the collar $h$ to follow the movement of the actuated disk and to recede for the same distance from the complemental stationary disk corresponding to the other slidable disk in respect to the movement toward the stationary disk. According to the decrease and a corresponding increase of the diameter of the bearing-surface of the disks $c\ c'$ and $c^2\ c^3$ the speed of rotation of the driving-pulley $e$ will be raised or lowered by the disks $c\ c'$ and $c^2\ c^3$ in its transmission to the driving-pulley $g$.

In order to permit the idler-wheels $f'$ and $f^2$ to assume varying angular positions with respect to the brackets $i$ and $i'$, but parallel to the rope or cable $f$, which angular positions are caused by the rope or cable $f$ passing over bearing-surfaces of changeable or varying diameters, the following preferred construction is used: Each of the idler-gears $f'$ and $f^2$ is carried by a spindle $f^4$, which has a range of vertical and rotary movements within a housing $l$, which is secured to the bar $i$ or $i'$ by means of bolts $l'$, passing through a slot $i^5$, arranged in the same, as shown in Fig. 3. The position of the housing $l$ on its supporting-bar is controlled by a set-screw $m$, which in conjunction with the spring $f^3$, surrounding the spindle $f^4$ and bearing against the housing $l$, is adapted to control the tension under which the rope or cable $f$ is held in engagement with the disks $c\ c'$ and $c^2\ c^3$.

Having thus described the nature and object of my invention, what I claim as new, and desire to secure by Letters Patent, is—

1. In a variable-speed-transmission device, a shaft, a pair of frusto-conical intermeshing disks, each provided with a hub having radiating arms, a rope or cable, a yoke, and means, in conjunction with the rope or cable and yoke, to positively control the position on the shaft of one of each of the pairs of disks.

2. In a variable-speed-transmission device, a shaft, two pairs of frusto-conical intermeshing disks mounted on the shaft and each provided with a hub, a rope or cable, a yoke, and means, in conjunction with the rope or cable and yoke, to control the position on the shaft of one of each of the pairs of disks.

3. In a variable-speed-transmission device, a frusto-conical disk having a hub with radiating arms and a corrugated rim, and ribs extending from the rim to the hub.

4. In a variable-speed-transmission device, a frusto-conical disk having a hub provided with radiating arms and a corrugated rim, the curved exterior faces of the arms merging into elevations of the corrugated rim, a flange projecting from said rim, and ribs extending from the rim to the hub and arranged at the internal face of the disk, in alinement with the arms.

5. A variable-speed-transmission device, comprising a shaft, two pairs of disks mounted on said shaft, one pair being disconnected from the other pair, a rope or cable, a yoke, and means, substantially as described, in conjunction with said rope or cable and yoke to positively control the position on the shaft of one of each of said pairs of disks.

In testimony whereof I have hereunto set my signature in the presence of two subscribing witnesses.

RIMMON C. FAY.

Witnesses:
J. WALTER DOUGLASS,
THOMAS M. SMITH.